United States Patent [19]

Kodama et al.

[11] 4,011,776

[45] Mar. 15, 1977

[54] TRANSMISSION

[75] Inventors: Masayuki Kodama; Shintaro Uchiyama, both of Tokyo, Japan

[73] Assignee: Fuji Jukogyo Kabushiki Kaisha, Tokyo, Japan

[22] Filed: Nov. 20, 1975

[21] Appl. No.: 633,918

[30] Foreign Application Priority Data

Dec. 2, 1974 Japan .................. 49-145587[U]

[52] U.S. Cl. .................. 74/789; 74/606 R
[51] Int. Cl.² .......................... F16H 3/44
[58] Field of Search ............ 74/789, 750 R, 801, 74/606 R; 188/82.8, 82.84, 206 R; 403/29, 30

[56] References Cited

UNITED STATES PATENTS 3,741,037  6/1973  Piret .................. 74/789 X

Primary Examiner—Samuel Scott
Assistant Examiner—Frank H. McKenzie, Jr.
Attorney, Agent, or Firm—Martin A. Farber

[57] ABSTRACT

A transmission includes a planetary gear unit, the carrier of which is connected to an outer race of a one-way brake. A member is constructed of a hub part formed with the inner race of the one-way brake, a cylindrical part splined to a transmission casing and means securing the parts with each other. The cylindrical part is made of the same material as that of the casing.

5 Claims, 2 Drawing Figures

TRANSMISSION

The present invention relates to a transmission, and more particularly to an automatic transmission of the planetary gear type.

A conventional automatic transmission of the planetary gear type is usually provided with a member extending radially inwardly from the inner surface of a transmission casing. This member has a hub portion formed with an inner race of a one-way brake, an outer race of which is common to a carrier of a planetary gear unit so as to receive the driving torque reaction on the carrier. The member is usually so constructed and arranged as to serve as a distributor of oil to the one-way brake, as a lubricant, and to the adjacent multiple disc brake, as an actuating medium. It must serve also as means for centering the one-way brake and the carrier of the planetary gear unit. Because the inner race of the one-way brake must be made of a steel, it is a conventional practice to make the member with the steel.

If the member is made of the steel, it is necessary to machine splines on outer surface of the member so as to establish splined connection with the casing. Since the casing is usually made of an aluminum alloy, the difference in coefficient of thermal expansion between the casing and the member of aluminum alloy may increase clearance at splines, resulting in the oil leaks and deteriorating the centering of the one-way brake and the carrier of the planetary gear unit.

It is therefor an object of the present invention to provide a transmission in which the shortcomings mentioned above are eliminated.

The other objects, features and advantages of the present invention will become apparent from the following description with reference to the accompanying drawings, in which.

Figure 1:
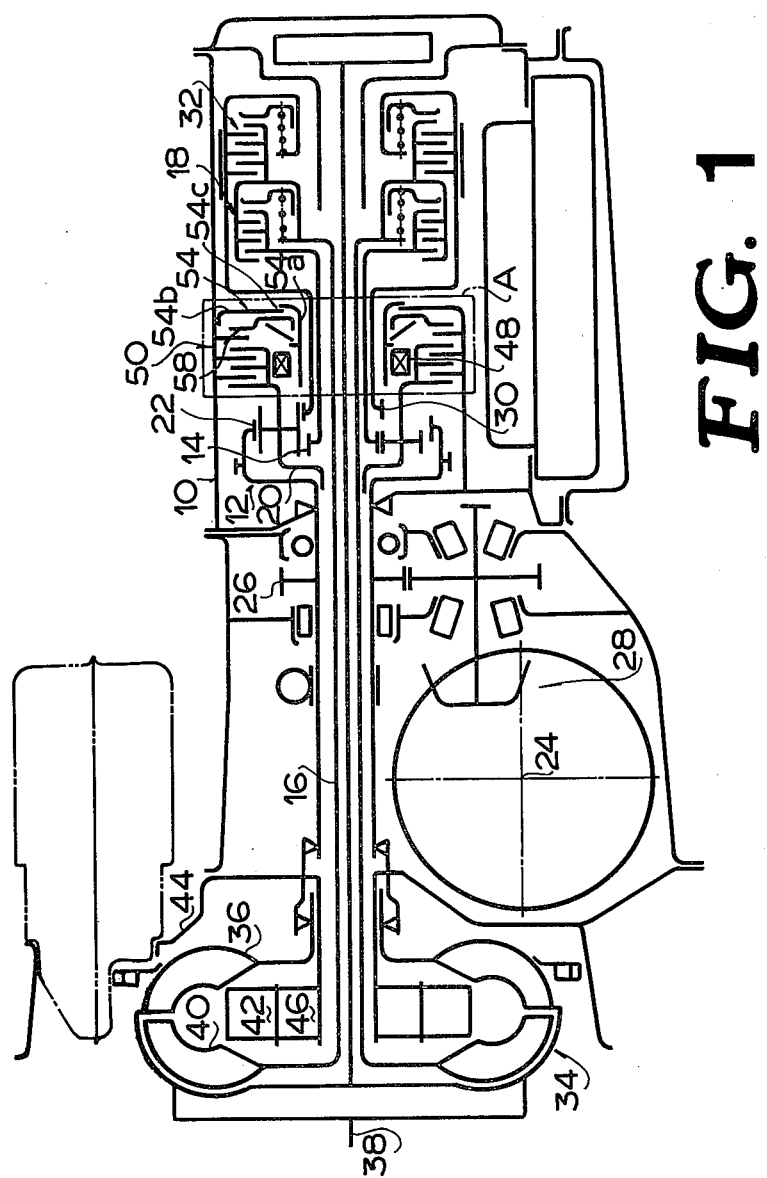
FIG. 1 is a diagrammatic view of the gear set of an automatic transmission.

In FIG. 1, a transmission casing is shown and designated as 10. The casing 10 is made of an aluminum alloy. Generally designated as the reference numeral 12 is a planetary gear unit having a forward sun gear 14, which is connectible with a turbine shaft 16 by a forward clutch 18, a carrier 20, a ring gear 22, which is connected to a transmission output shaft 24 through a reduction gear 26 and hypoid gears 28, and a reverse sun gear 30, which is connectible with the turbine shaft 16 by a reverse clutch 32. A torque converter 34 comprises an impeller 36, which is connected to an engine crank shaft 38, a turbine 40, which is connected to the turbine shaft 16, and a stator 42, which is connected to a casing 44 through a one-way brake 46.

The carrier 20 of the planetary gear unit 12 is prevented from rotating in one direction by a one-way brake 48, although it is permitted to rotate in the opposite direction. The carrier 20 is brakeable by a multiple disc brake 50.

Figure 2:
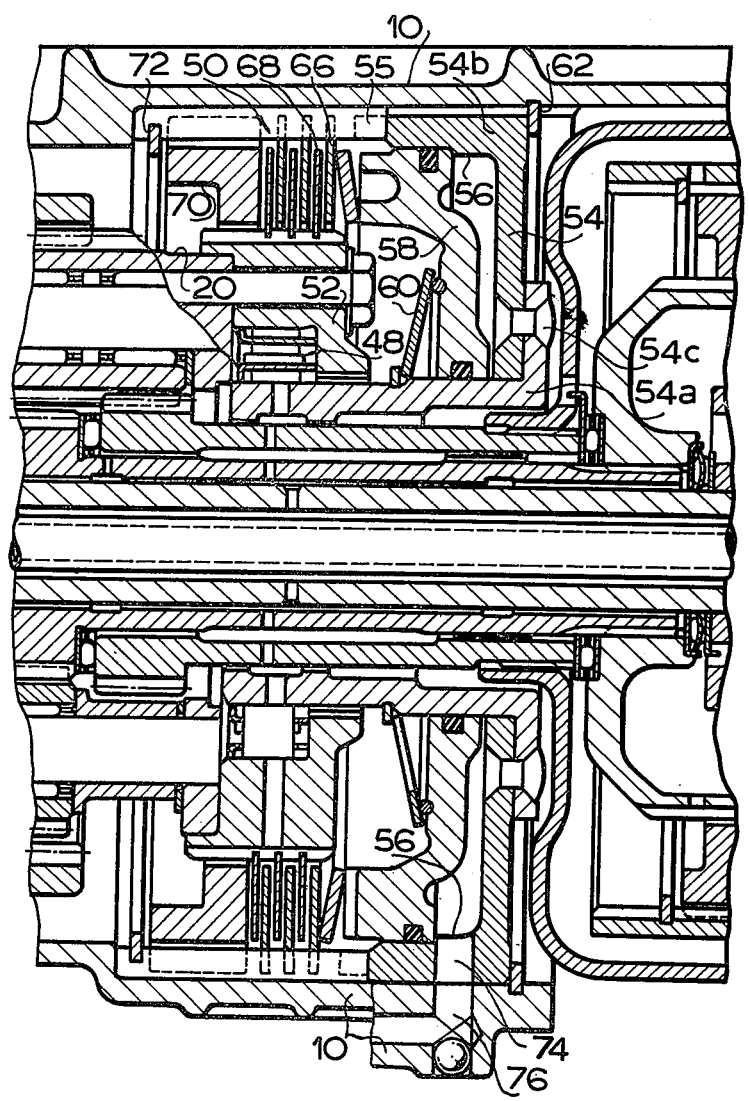
FIG. 2 is a fragmentary enlarged view of the gear set shown in FIG. 1.

Referring now to FIG. 2, there is shown an enlarged view of a portion enclosed in a rectangle by imaginary lines A in FIG. 1. As best seen in this Figure, the one-way brake 48 has an outer race 52 that is common to the carrier 20 and an inner race formed on a hub part 54a of a member 54. The member 54 includes also a cylindrical part 54b which is splined to at 55 or connected to the casing 10 at its outer surface. The cylindrical part 54b and hub part 54a are riveted by a plurality of rivets, one being shown at 54c, to define an annular cylinder 56 within which is slidably situated an annular piston 58. The piston 58 is urged normally in a right-hand direction by means of a clutch spring 60. The hub part 54a is formed with a suitable material for the inner race of the one-way brake 48, such as a steel, whereas the cylindrical part 54b is made of the same material as that of the casing 10, that is, an aluminum alloy. The member 54 is held axially fast by means of snap rings 62. It will be noted that the driving torque reaction on the carrier 20 is received by the member 54 through the one-way brake 48. The multiple disc brake 50 includes discs 66 which are externally splined to the casing 10 and discs 66 which are internally splined to the outer race 52, which is common to the carrier 20. Designated by the reference numeral 70 is a back up plate splined to and axially fast on the casing by a snap ring 72, and designated by the reference numeral 74 and 76 are oil holes communicating with the cylinder 56.

The operation of the transmission will now be briefly explained.

The forward clutch 18 is applied during operation in the forward drive range in any speed ratio. If all the brakes are released, turbine torque delivered to the turbine shaft 16 is delivered to the sun gear 14 through the forward clutch 18 and since the carrier 20 is prevented from rotation by the one-way brake 48, the ring gear 22 delivers torque to the output shaft 24 through the reduction gear 26 and hypoid gears 28 at a first speed ratio. When the transmission is to be fixed to the first speed ratio, the brake 50 is applied.

The reverse clutch 32 is applied during operation in the reverse drive range. To obtain a reverse speed ratio the forward clutch 18 is released, the clutch 32 is applied and the brake 50 is applied. The turbine torque on the turbine shaft 16 is now delivered to the sun gear 30 and since the carrier 20 is locked, the ring gear 22 delivers torque to the output shaft 24.

From the preceding description it will be noted that according to the present invention the member 54, which is formed with the inner race of the one-way brake 48 and splined to the casing 10, is made of two parts 54a and 54b which are secured with each other such as by rivets 54c, and the part 54a is made of the same material as that of the inner race of the one-way brake and the part 54b is made of the same material as that of the casing 10.

Because the casing 10 and the part 54b splined to the casing are made of the same material, i.e., an aluminum alloy, the possibility of an increase of clearance at splines 55 under high temperatures will be reduced. Therefore it will be appreciated that oil leaks through the splines 55 are prevented and centering of the one-way brake 48 is assured.

As the part 54b, which is splined to the casing 10, is made of an aluminum alloy, this contributes to reduction in weight and cost, of the member 54. Besides the use of aluminum alloy as a material of the part 54b permits the manufacture of the part 54b by casting process, eliminating the machine process in forming splines.

What is claimed is:

1. In a transmission,
   a casing made of a first material, a planetary gear unit coaxially disposed in said casing, said planetary gear unit including a carrier of planetary gears, a one-way brake means for braking said carrier, said one-way brake means being coaxially disposed in said carrier, said one-way brake means including an inner race and an outer race, said outer race being secured to said carrier, a member comprising a first part made of a second material and a second part made of said first material, said first part forming said inner race, said second part being secured to said casing, and said first and said second part being secured to each other, whereby a driving torque reaction on said carrier is received on said casing through said one-way brake means and said member.

2. In the transmission as set forth in claim 1, wherein said first material is different from said second material.

3. In the transmission as set forth in claim 1, wherein said second material is steel, said first material is an aluminum alloy.

4. In the transmission as set forth in claim 2 wherein said first material is aluminum alloy.

5. In the transmission as set forth in claim 1 further comprising means for holding said second part axially fast relative to said casing, spline means for securing said second part to said casing.

* * * * *